United States Patent [19]

Williams, Jr.

[11] Patent Number: 4,986,706

[45] Date of Patent: Jan. 22, 1991

[54] HEADER WALL

[76] Inventor: John J. Williams, Jr., 9543 Horton, Overland Park, Kans. 66212

[21] Appl. No.: 851,808

[22] Filed: Apr. 14, 1986

[51] Int. Cl.$^5$ ............................................. B61D 45/00
[52] U.S. Cl. ...................................... 410/129; 410/140
[58] Field of Search ............... 410/122, 123, 124, 127, 410/128, 129, 140, 141, 142

[56] References Cited

U.S. PATENT DOCUMENTS

| | | | |
|---|---|---|---|
| 2,565,997 | 8/1951 | Stone | 410/129 |
| 2,594,208 | 4/1952 | Pilot | 410/129 |
| 2,974,931 | 3/1961 | Reel et al. | 410/128 |
| 3,044,800 | 7/1962 | Wicker | 410/129 X |
| 3,059,593 | 10/1962 | Mack | 410/140 X |
| 4,411,349 | 10/1983 | Stedman et al. | 410/129 X |
| 4,456,415 | 6/1984 | Joice-Cavanagh | 410/129 |

FOREIGN PATENT DOCUMENTS 833030  4/1960  United Kingdom ................ 410/129

*Primary Examiner*—Margaret A. Focarino
*Assistant Examiner*—Joseph D. Pape

*Attorney, Agent, or Firm*—Kokjer, Kircher, Bradley, Wharton, Bowman & Johnson

[57] ABSTRACT

A lightweight, portable, cargo-retaining header wall is provided which serves to vertically, transversely, and securely span the interior space between opposed walls of a polygonal cargo-receiving container such as a truck trailer or railroad boxcar to prevent cargo shifting beyond the header wall. The header wall preferably includes: a bottom rollered lattice structure composed of a plurality of interconnected bars spaced just closely enough to prevent cargo movement therethrough; a jacking member; and a driving assembly mounted to the lattice structure and receiving the jacking member for incrementally moving the jacking member, the assembly having an operating lever. To use the header wall, a person rolls or lifts it into a transverse, vertical, interior position between two parallel container walls and then moves the lever back and forth to advance the outboard end of the jacking member into tight-fitting engagement with the adjacent container wall; continued operation of the lever causes the opposed side of the lattice structure to also tightly engage its adjacent container wall to thereby secure the header wall between two opposed container walls.

3 Claims, 1 Drawing Sheet

HEADER WALL

BACKGROUND OF THE INVENTION

1. Field of the Invention

This invention relates to a portable, cargo-retaining header wall for use in a freight container such as a truck trailer or railroad boxcar and which has numerous advantages including light weight, convenience, and reliability in preventing shifting of cargo beyond the header wall. More particularly, this invention is concerned with a header wall having a lattice structure of a plurality of interconnected spaced bars, a jacking member, and a driving assembly mounted to the lattice for receiving and advancing the jacking member into tight-fitting engagement with an adjacent container wall.

2. Description of the Prior Art

Cargo in a freight container may shift or fall during transit of the container; this is particularly true in a container only partially loaded. Such shifting and falling may damage the cargo or the container walls and may create a safety hazard if the cargo load rapidly shifts forward during a deceleration of the container. Additionally, cargo shifting may disturb the loading order of the cargo requiring additional labor expense to restack or reorder the cargo. In a situation where pieces of cargo are intended for different destinations, cargo shifting may mix up the loading arrangement and cause some cargo pieces to be misrouted or even lost by causing the pieces to be unloaded at the wrong location or not unloaded at the correct location, all of which causes additional expense to correct.

Devices in use to prevent cargo shifting include chains strung between container walls across the face of a cargo load or wood slats nailed to container walls to hold the cargo in place. These old solutions to cargo shifting problems achieve less than desired effectiveness or require excessive labor and material expense.

3. SUMMARY OF THE INVENTION

The cargo shifting problem discussed above is in large measure solved by a header wall in accordance with the present invention. That is to say, the header wall hereof is of lightweight construction which allows one person to quickly, conveniently, and securely install the header wall vertically and transversely between two parallel walls of a freight container to prevent cargo shifting.

The header wall in accordance with the present invention broadly includes a barrier for vertically spanning the interior of a cargo receiving container between two opposed walls of the container, an elongated, axially movable jacking member, and a driving assembly coupling the barrier and the jacking member for incrementally moving the jacking member in the direction of its outboard end so that the outboard end tightly engages one of the container walls; the barrier tightly engages the second container wall when the outboard end of the jacking member tightly engages the first container wall.

In particularly preferred forms, the barrier is composed of a plurality of interconnected, spaced bars which form an open lattice structure with spaces just small enough to prevent cargo movement therethrough. Additionally, the jacking member has its inboard end slidably received within a tubular element mounted to the barrier; and the driving assembly is provided with an operating lever. Even more particularly, the barrier is disposed transversely and normally to two opposed longitudinal sidewalls of a truck trailer, for example, and a pair of driving assemblies is provided with a pair of parallel jacking members coupled respectively thereto so that the outboard ends of the jacking elements tightly engage one of the trailer sidewalls and the opposed side of the barrier tightly engages the other parallel sidewall.

DESCRIPTION OF THE PREFERRED EMBODIMENT

Figure 1:
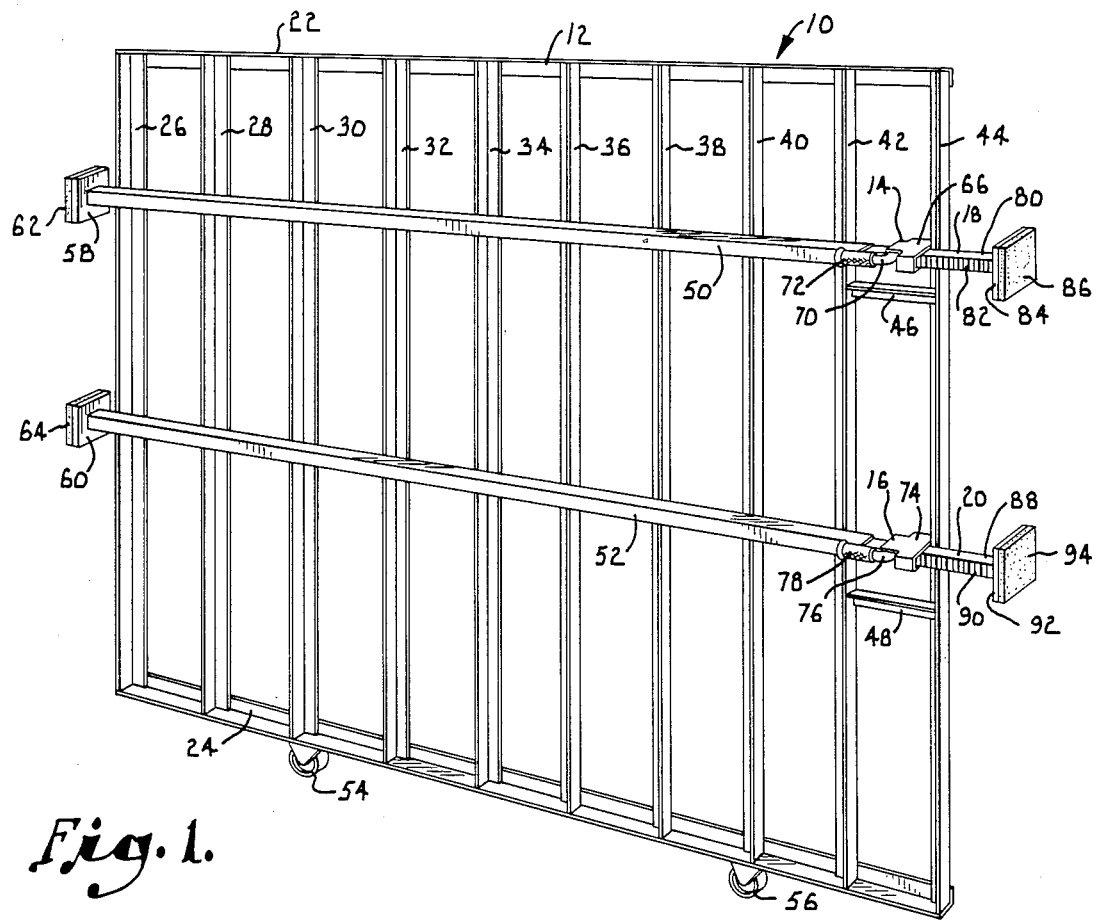
FIG. 1 is a perspective view of the apparatus.

Referring now to FIG. 1, header wall 10 in accordance with the present invention broadly includes lattice barrier 12, driving assemblies 14 and 16, and jacking members 18 and 20.

In more detail, lattice barrier 12 includes spaced horizontal bars 22 and 24, spaced vertical bars 26, 28, 30, 32, 34, 36, 38, 40, 42, and 44, support bars 46 and 48, abutment tubes 50 and 52, and rollers 54 and 56. In the preferred embodiment herein described bars 22-48 interconnect to form a latticework with the spacing between bars just close enough to prevent cargo movement therethrough. More particularly, for example, bars 22-48 are one inch by one inch by one-eighth inch angle iron interconnected by welding, bolting, riveting or the like. As shown in FIG. 1, horizontal bars 22 and 24 are interconnected with vertical bars 26 and 44 to form a rectangular framework in which bars 28-42 are vertically and evenly spaced between vertical bars 26 and 44 and are are attached to horizontal bars 22 and 24 at the respective ends of vertical bars 28-42. Support bars 46 and 48 are connected to and interposed between vertical bars 42 and 44 to add additional structural strength in the vicinity of jacking assemblies 14 and 16 (described in more detail below).

One skilled in the art will appreciate that a wide variety of structural materials, shapes, and spacings can be used to form a cargo barrier depending on the particular application. For example, if the cargo to be restrained is composed of large cardboard cartons of a lightweight material such as paper towels, the bars might be aluminum angles or tubing. Indeed, with such an intended purpose, some of bars 22-48 might even be eliminated or replaced by flexible chains or the like in lieu of rigid angle structures. A latticework is preferred to maximize structural strength while minimizing the weight of header wall 10; however, the present invention certainly contemplates barrier 12 composed of a solid wall of sheet metal or the like, for example, which may be required for some applications.

Barrier 12 also includes horizontally disposed, spaced, rectangular abutment tubes 50 and 52. As shown in FIG. 1, abutment tubes 50 and 52 contact vertical bars 26-42 and are fixed thereto by welding, bolting, riveting or the like in order to increase the structural strength of header wall 10 and to serve as an integral, structural component of the latticework of barrier 12. Additionally, abutment tubes 50 and 52 are adapted to slidably receive jacking members 18 and 20 discussed in more detail below. The rightward ends of abutment tubes 50 and 52 terminate approximately midway between vertical bars 42 and 44, the leftward ends of tubes 50 and 52 terminate on the leftward and outboard side of vertical bar 26. Tubes 50 and 52 also include rectangular, flat abutment plates 58 and 60 which are coaxially mounted to the leftward ends of tubes 50 and 52 respectively by welding, bolting, riveting or the like. Flat, rectangular, rubber pads 62 and 64 are flushly mounted to abutment plates 58 and 60 respectively by gluing, bolting, riveting or the like.

Barrier 12 also includes rollers 54 and 56 which are attached to the bottom of horizontal bar 24 as shown in FIG. 1.

Figure 2:
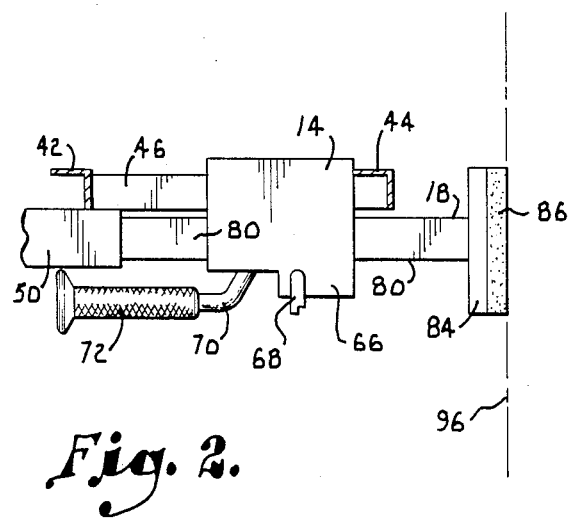
FIG. 2 is a plan view of a driving assembly shown mounted to the lattice barrier and receiving the jacking member.

Referring now to FIG. 2, driving assembly 14 includes housing 66, rotatable, action-reversing tab 68, and reciprocal operating lever 70. Housing 66 contains a mechanism (not shown) such as holding and advancing pawls for incrementally advancing or reversing jacking member 18 axially received therewithin; such a mechanism is exemplified by a typical automobile tire-jacking mechanism. Reversing tab 68 is rotatable counterclockwise 90° from the forward position as shown to the reversing position for reversinq the incremental action of assembly 14 on jacking member 18. One end (not shown) of operating lever 70 operably engages the mechanism of housing 66 for translating the reciprocal motion of lever 70 into unidirectional axial movement of jacking member 18. The other end of lever 70 includes slip-resistant manual grasping surface 72. Lever 70 is bent in the middle to form an angle of approximately 120° so that the axis of gripping surface 72 is parallel to the plane of barrier 12 when lever 70 is in its normal rest position.

Assembly 14 is mounted to barrier 12 by preferably welding assembly 14 to vertical bar 44 at a location about one-fourth to one-third of the distance from the top of bar 44 with handle 70 and tab 68 oriented outwardly from the plane of barrier 12. Additionally, assembly 14 is coaxially aligned with abutment tube 50 as shown in FIGS. 1 and 2. Driving assembly 16 (FIG. 1) is substantially identical to assembly 14 and similarly mounted to barrier 12 in the same relative orientation except that assembly 16 is mounted one-half to three-fourths of the distance from the top vertical bar 44 and is coaxially aligned with tube 60 instead of tube 58 for axially receiving jacking member 20 instead of member 18. Assembly 16 correspondingly includes housing 74, a reversing tab (not shown), operating lever 76, and gripping surface 78 (FIG. 1).

Jacking member 18 includes rectangular member 80, one face of which includes a plurality of grooves 82 oriented perpendicular to the long axis of member 80 and adapted for engaging the pawls (not shown) contained within housing 66. Rectangular member 74 is also adapted to be partially received within housing 66 and abutment tube 50 and is so received. Jacking member 18 also includes abutment plate 84 which is substantially identical to abutment plates 58 and 60 and which is coaxially mounted, preferably by welding, to the rightward and outboard end of rectangular member 80. Abutment plate 84 includes rubber pad 86 which is substantially identical to rubber pads 62 and 64 and which is flushly mounted to the rightward and outboard face of abutment plate 84. Jacking member 20 is substantially identical to jacking member 18 and includes rectangular member 80, grooves 90, abutment plate 92, and rubber pad 94, all of which correspond to similarly named components of member 18. Jacking member 20 is slidably received within driving assembly 16 and abutment tube 52 in the same orientation relative to barrier 12 as jacking member 20.

To use header wall 10 one individual user can grasp header wall 10 and place it into a container such as a truck trailer which contains cargo to be restrained. The user then rolls header wall 10 by way of rollers 54 and 56 into a position within the truck trailer so that the plane of header wall 10 is vertical and disposed transversely between two longitudinal sidewalls of the container with the outward face of header wall 10 containing lever 70 oriented outwardly from the cargo to be restrained and so that the inward face of wall 10 abuts the cargo.

The user then grasps gripping surface 72 of operating lever 70 with one hand while holding header wall 10 in position with the other hand and reciprocally moves lever 70 outwardly and back to cause the mechanism (not shown) contained within housing 66 to engage grooves 82 of rectangular member 80 and thereby advance jacking member 18 axially and outwardly toward adjacent container sidewall 96 (FIG. 2). Continued operation of lever 70 causes rubber pad 86 to eventually abut wall 96. When this occurs, further continued operation of lever 70 causes the relative motion between jacking member 18 and driving assembly 14 to continue, but because the outboard end of jacking member 18, that is, rubber pad 86, is abutting wall 98, actual movement of jacking member 18 cannot occur and driving assembly 14 moves leftwardly relative to jacking member 18 and thereby carries coupled lattice barrier 12 leftwardly also so that rubber pad 62 abuts the leftmost sidewall of the container. Continued operation of lever 70 will cause continued relative movement of jacking member 18 and driving assembly 14 to thereby compress rubber pads 62 and 86 into tight fitting engagement with the container sidewalls. At this point, the user ceases operating lever 70.

The user then grasps gripping surface 78 to operate lever 76 outwardly and back again in a reciprocal motion to advance jacking member 20 relative to driving assembly 16, thereby compressing rubber pads 94 and 64 into tight fitting engagement with the container sidewalls in a manner substantially identical to the operation of driving assembly 14 and jacking member 18. At this point the user then ceases operation of lever 76. Header wall 10 is now securely in place by virtue of driving assemblies 14 and 16 holding pads 62, 64, 86 and 94 in compressive tight fitting engagement with the sidewalls of the container. This tight fitting engagement causes a high degree of static friction to exist between pads 62, 64, 80, and 88, and the sidewalls of the container which friction prevents movement of header wall 10 in any direction relative to the sidewalls of the container, thereby providing a secure restraint against shifting of cargo beyond header wall 10.

Figure 3:
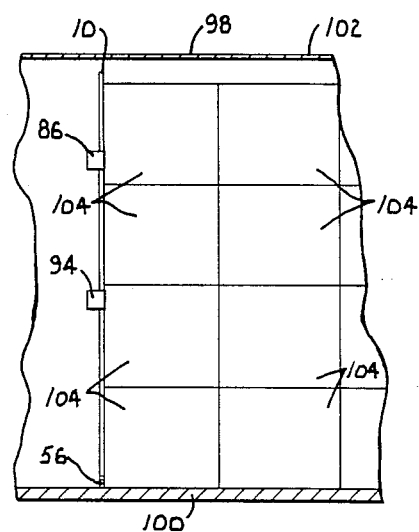
FIG. 3 is a side elevational view through the side of a cargo container showing the apparatus in use restraining cargo boxes.

FIG. 3 illustrates header wall 10 in a typical installation wherein wall 10 is vertically disposed between top wall 98 and bottom wall 100 of container 102 with pads 86 and 94 represented as engaging sidewall 96 (not shown in FIG. 3 in order to more clearly illustrate the use of wall 10). In this position, header wall 10 is restraining a number of cartons 104.

When the user wishes to remove header wall 10 from its functional position within a container, the user essentially reverses the installation steps discussed above. The user first rotates tab 68 counterclockwise one-quarter of a turn which realigns the mechanism of housing 66 so that back and forth operation of lever 70 causes jacking member 18 to advance axially leftwardly with the leftmost end of rectangular member 80 advancing into abutment tube 50. As jacking member 18 advances leftwardly, the compressive load on pads 86 and 62 is relieved. As jacking member 18 continues to advance leftwardly pad 86 disengages from container wall 96. The user then repeats the steps described above in connection with assembly 16 and jacking member 20 in order for assembly 16 and jacking member 20 to disengage pads 64 and 94 from contact with the container walls. Header wall 10 is now free for removal and further use as desired.

One skilled in the art will appreciate that many variations in the construction of the header wall herein described are possible and which are still contemplated by the present invention. For example, the orientation of tubes 50 and 52, assemblies 14 and 16, and jacking members 18 and 20 could be vertical instead of horizontal to engage the top and bottom walls of a container instead of the side walls. Additionally for example, driving assemblies 14 and 16 could include a worm-gear driven yoke assembly for advancing jacking members 18 and 20 instead of the pawl-driven jacking means herein described.

Having thus described the preferred embodiment invention, what is claimed as new and desired to be secured by Letters Patent is:

1. A portable, cargo retaining apparatus for a cargo receiving vehicle having spaced apart side walls, said apparatus comprising:
   a substantially rectangular barrier having a plurality of rigid bars interconnected in a criss-crossing pattern, said barrier having a size to fit in the vehicle between the walls thereof with opposite ends of the barrier located adjacent the respective walls;
   a first pair of abutment elements on one end of said barrier for engagement with the wall adjacent said one end of the barrier;
   a second pair of abutment elements mounted on the other end of said barrier for in and out movement away from and toward the wall adjacent said other end;
   jacking means for moving the second pair of abutment elements in and out by jacking action to permit the elements in the second pair to be jacked against the adjacent wall to tightly retain the barrier in place in extension between the walls, and to permit the elements in the second pair to be retracted away from the adjacent wall to release the barrier; and
   a plurality of wheels on said barrier permitting the barrier to be wheeled along a supporting surface, said wheels directly underlying the barrier to permit the barrier to be placed directly against a load in the vehicle with said bars in direct contact with the load.

2. A portable, cargo retaining apparatus for a cargo receiving vehicle having spaced apart side walls, said apparatus comprising:
   a substantially rectangular barrier having a plurality of rigid horizontal bars and a plurality of rigid vertical bars interconnected in a criss crossing pattern, said barrier having a size to substantially span the walls of the vehicle with opposite ends of the barrier located adjacent the respective walls;
   a first pair of abutment elements projecting from one end of said barrier for engagement with the wall adjacent said one end, said abutment elements projected from a selected pair of said horizontal bars;
   a pair of jack mechanisms each having a jack housing rigidly secured to one of said vertical bars on the other end of said barrier and a rigid bar extending through the jack housing, said rigid bars being coaxial with said selected pair of horizontal bars and extending therefrom beyond said one vertical bar;
   a second pair of abutment elements carried on outer ends of the respective rigid bars to engage the wall adjacent said other end of the barrier upon axial extension of said rigid bars by the jack mechanism; and
   a handle projecting from each jack housing, said handles being reciprocable to effect axial extension and retraction of said rigid bars by jacking action in respective extension and retraction modes of the jacking mechanisms, whereby the abutment elements in said second pair may be mechanically jacked against the vehicle wall to retain the barrier in place and released from the wall by reciprocating the handle in the retraction mode.

3. Apparatus as set forth in claim 2, wherein said vertical bars included a second bar spaced from and parallel to said one bar, and including a pair of rigid braces formed by rigid bars extending between said one bar and said second bar at locations adjacent said jack housings.

* * * * *